Nov. 24, 1931.  J. C. NUVER, SR  1,833,753
COMBINED SHUTTLE AND TIP
Filed May 1, 1931
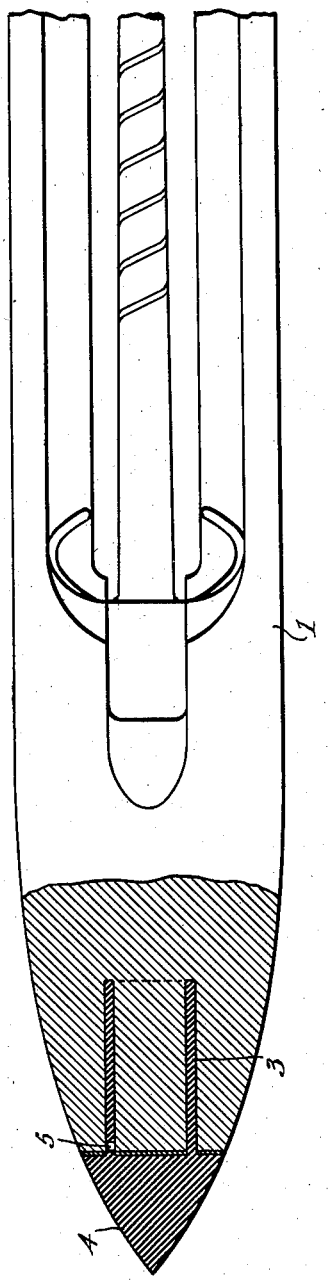
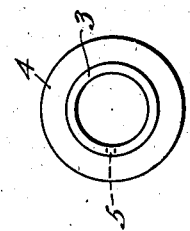
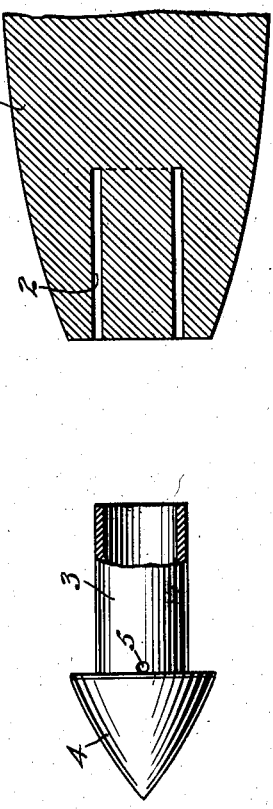
WITNESSES
Edw. Thorpe
A. L. Kitchin
INVENTOR
Joseph Constant Nuver Sr.
BY Munn & Co.
ATTORNEY Patented Nov. 24, 1931

1,833,753

UNITED STATES PATENT OFFICE

JOSEPH CONSTANT NUVER, SR., OF ALLENTOWN, PENNSYLVANIA

COMBINED SHUTTLE AND TIP

Application filed May 1, 1931. Serial No. 534,379.

This invention relates to a combined shuttle and tip, the object being to provide an improved construction wherein the tip remains tight at all time during the operation of the shuttle.

Another object of the invention is to provide an improved shuttle and tip wherein the parts are so formed and interlocked that the danger of splitting the shuttle when the tip is forced in place has been reduced to a minimum.

An additional object is to provide an improved shuttle and tip wherein the tip is formed with a gripping portion which contacts on four faces with parts of the shuttle for holding the tip substantially rigidly in place.

In the accompanying drawings,

Figure 1 is a side view of part of the combined shuttle and tip disclosing an embodiment of the invention, one end of the shuttle and also the tip being shown in section.

Figure 2 is a view of the lefthand part of the structure shown in Figure 1, the tip being shown slightly spaced from the shuttle.

Figure 3 is an end view of the tip shown in Figure 2.

Referring to the accompanying drawings by numerals, 1 indicates a shuttle body of the usual shape, the same being made from wood and provided with an annular socket 2 a desired distance for receiving the tubular extension 3 of the tip body 4. An aperture 5 is provided in the extension 3 so that when the tip is moved from the position shown in Figure 2 to the position shown in Figure 1 the air may escape from socket 2 through the aperture 5. This will permit the tip to be forced quickly and accurately into position without danger of splitting the body 1.

If desired, shellac or cement of any desired kind could be placed in the socket 2 before the extension 3 is forced therein. It will be noted that the extension 3 is hollow so that the inner and outer surfaces thereof contact with the inner and outer surfaces of the body 1 forming socket 2 whereby the extension is gripped at any point and held against accidental removal or in fact against any removal unless appreciable power is used.

Heretofore, the tips were usually formed with a central rod adapted to be driven into a central hole in the body 1. This old structure resulted in much loss by reason of the fact that the body 1 would be split when the tip was forced in place. By using the tubular extension 3, the parts may be forced into the socket 2 and gripped at any point without any danger of splitting the body, while at the same time presenting a very efficient connecting structure connecting the tip with the body. This connection is such that it will not come loose as the shuttle is used.

I claim:

A shuttle including a wooden body having a flat end, a metal tip having a tubular extension projecting into the body while the entire base of the tip fits against said flat end, said tubular extension having a vent opening at the juncture thereof with the body of the tip to relieve the confined air as the base is forced against said flat end.

JOSEPH CONSTANT NUVER, SR.